United States Patent [19]

Vandenengel

[11] Patent Number: 5,734,151
[45] Date of Patent: Mar. 31, 1998

[54] SLOTLESS CARD READER

[75] Inventor: Gerald W. Vandenengel, Grafton, Mass.

[73] Assignee: Oki Electric Industry Co., Inc., Tokyo, Japan

[21] Appl. No.: 617,506

[22] Filed: Mar. 15, 1996

Related U.S. Application Data

[63] Continuation of Ser. No. 342,467, Nov. 21, 1994, Pat. No. 5,517,011.

[51] Int. Cl.⁶ .................................................. G06K 19/06
[52] U.S. Cl. ............................ 235/441; 235/438; 235/440
[58] Field of Search ................................ 235/438, 440, 235/441

[56] References Cited

U.S. PATENT DOCUMENTS

| | | |
|---|---|---|
| 4,100,856 | 7/1978 | Ziemba . |
| 4,379,966 | 4/1983 | Flies . |
| 4,404,464 | 9/1983 | Moreno ............................ 235/438 |
| 4,489,615 | 12/1984 | Mollet . |
| 4,931,991 | 6/1990 | Cvijanovich . |
| 5,015,830 | 5/1991 | Masuzawa et al. . |
| 5,091,618 | 2/1992 | Takahashi . |
| 5,231,274 | 7/1993 | Reynier . |
| 5,272,319 | 12/1993 | Rey . |
| 5,317,138 | 5/1994 | Togawa ............................ 235/440 |

FOREIGN PATENT DOCUMENTS

| | | |
|---|---|---|
| 0 329 557 A | 8/1989 | France . |
| 2 714 985 A | 7/1995 | France . |
| 0 196 929 A | 10/1986 | Japan . |
| 60-220482 | 2/1987 | Japan . |
| 62-81262 | 5/1987 | Japan . |
| 62-43788 | 5/1988 | Japan . |
| 5-108907 | 4/1993 | Japan . |
| 63-124183 | 11/1995 | Japan . |
| WO 94/23399 | 10/1994 | WIPO . |

*Primary Examiner*—Harold Pitts
*Attorney, Agent, or Firm*—Morgan & Finnegan LLP

[57] ABSTRACT

A portable smart card reader for reading and displaying information stored on a smart card comprising a thin housing having an upper surface and a lower surface, a flexible cover affixed to and spaced from the lower surface a plurality of electrical contacts affixed to the lower surface, a reader circuit contained within the housing and connected to the electrical contacts and a display on the housing connected to the reader circuit. A smart card can be placed against the contacts and the circuit can read information stored on the smart card and display the information. Since the reader has no slot with a rigid lower portion, the reader is thin and more easily carried.

6 Claims, 4 Drawing Sheets

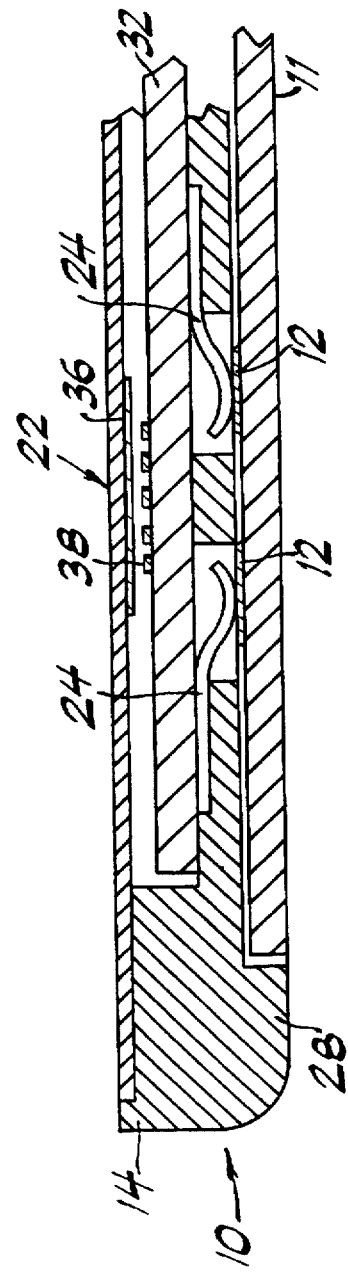
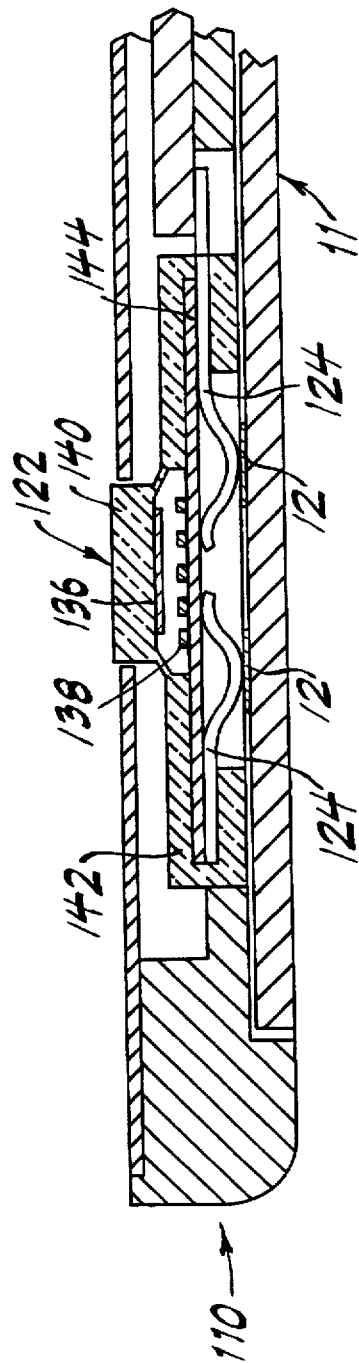

SLOTLESS CARD READER

CROSS REFERENCE TO RELATED APPLICATION

This application is a continuation of U.S. application Ser. No. 08/342,467, filed Nov. 21, 1994 now Pat. No. 5,517,011.

FIELD OF THE INVENTION

This invention relates to readers for smart cards and, in particular, to a reader that can read such a card without the traditional slot into which the card is inserted.

BACKGROUND OF THE INVENTION

Smart cards have become widespread as the uses for such cards multiplies. Subway riders can now purchase a card with a desired value programmed into the card, with the stored value decreasing by an amount equal to the fare each time the user uses the card to gain access to the subway system. Similar cards are used in vending machines, allowing users to carry one card to use for all their vending purchases instead of needing change or single dollars. The programmed amount on the card is reduced each time a purchase is made. Prepaid telephone smart cards are also popular.

Furthermore, smart cards that do not store cash information can also be used. For example, drivers licenses can store personal or medical data, etc.

One disadvantage with smart cards is that the user has no easy way of determining the data that is stored on the card unless he or she remembers it. If the user forgets, then he or she must normally go to a machine that accepts such cards to find out what is stored on the card (e.g., the amount of money that is left on the card.).

Portable card readers have been developed to allow a user to more easily determine the remaining value on all the cards in his or her possession. Such a reader, for example, is shown in U.S. Pat. No. 5,015,830 to Masuzawa et al. and features a reader having a slot into which the card is inserted, electronic reading circuits for reading the information stored on the card and a display for displaying the read information to the user. Although the Masuzawa device is small enough to be portable, it is, nevertheless, too large for many users to carry it around with them on a regular basis. Furthermore, the slot on such a device traps dirt and debris which can eventually render the device inoperative.

SUMMARY OF THE INVENTION

The disadvantages of the prior art have been overcome by the present invention which features a portable card reader that is smaller than prior card readers and includes no slot to trap dirt etc.

In one aspect, the invention features a portable smart card reader for reading and displaying information stored on a smart card, the reader comprising: a housing having an upper surface and a lower surface; a plurality of electrical contacts affixed to the lower surface; a reader circuit contained within the housing and connected to the electrical contacts; and a display on the housing and connected to the reader circuit; wherein a smart card can be placed against the contacts and the circuit can read information stored on the smart card and display the information.

In preferred embodiments, the reader includes a switch for activating the reader when a smart card is placed against the contacts on the exposed lower surface, the switch being activated when pressure is directly applied by the user both to an upper surface of the switch and to the lower surface of the smart card (e.g., by squeezing the reader and smart card together).

The electrical contacts preferably protrude from the exposed lower surface of the reader and, when a smart card is placed against the contacts, the contacts retract toward the housing. The exposed lower surface can be wider than a smart card to be read, and include guides protruding from the bottom surface to guide the smart card to position contacts on the surface of the smart card against the contacts on the lower surface.

The switch can be positioned on the upper surface and is aligned with the contacts on the lower surface. Furthermore, the switch can, when it is depressed, cause the contacts to protrude further away from the lower surface.

Acccordingly, the invention is a slotless card reader where all of the circuitry for reading is positioned above the card being read. Since there is no traditional slot, the reader can be made substantially thinner and there is no danger of objects or debris being trapped in the slot.

Other advantages will be apparent to those of skill in the art from the following detailed description of the preferred embodiments.

BRIEF DESCRIPTION OF THE DRAWINGS

FIG. 3 is a cross-sectional side view of the reader ad smart card of FIGS. 1 and 2 with the card contacting the reader.

FIG. 4 is a cross-sectional side view of a second embodiment of the present invention.

DETAILED DESCRIPTION OF A PREFERRED EMBODIMENT

Figure 1:
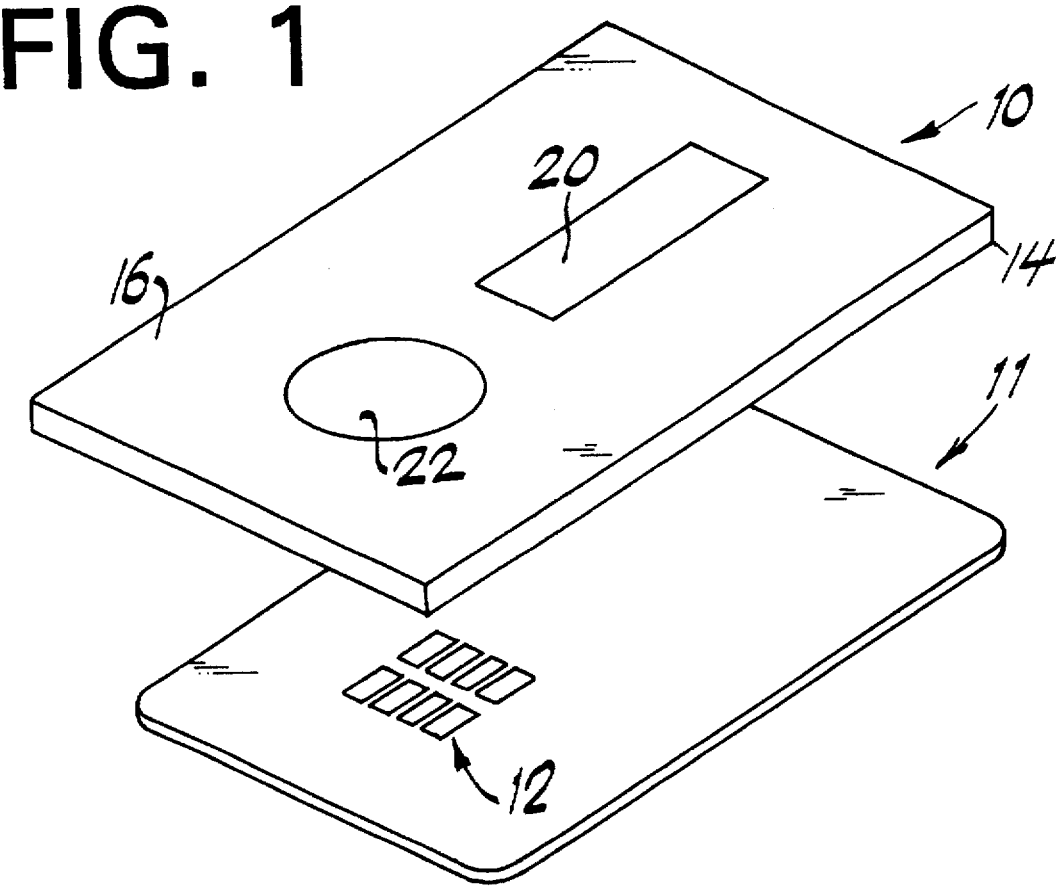
FIG. 1 is a perspective overhead view of a slotless reader of a first embodiment of the invention positioned over a smart card.

Referring to FIG. 1, a smart card reader 10 is shown positioned above and spaced from a smart card 11. The smart card 11 is any standard smart card that stores information and includes a plurality of contact pads 12 which are used by the reader to access the stored information. Reader 10 includes a housing 14, having an upper surface 16 and a lower surface 18 (see FIG. 2). A display 20 and a switch 22 are positioned on upper surface 16.

Figure 2:
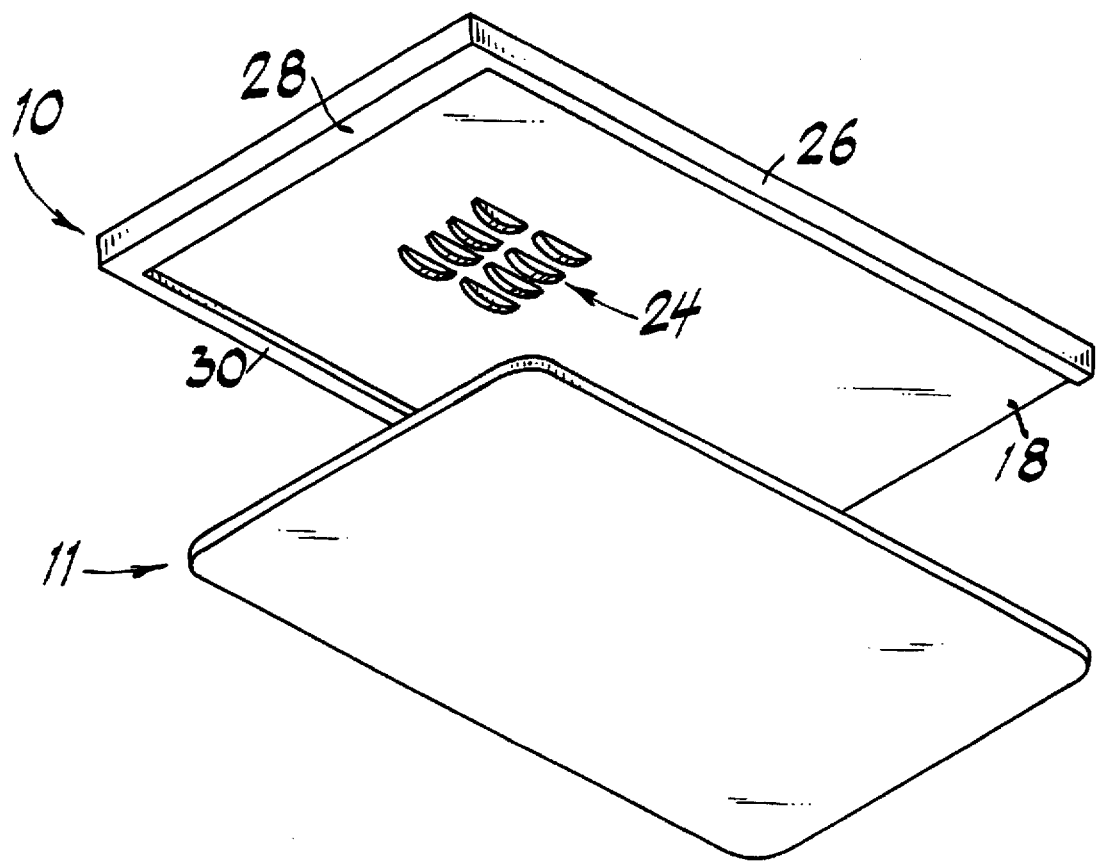
FIG. 2 is a perspective bottom view of the reader and smart card of FIG. 1.

Bottom surface 18 of reader 10 is shown in FIG. 2 and includes electrical contacts 24 that correspond to the contacts on smart card 11, as explained further below. Contacts 24 normally protrude slightly from bottom surface 18. Bottom surface 18 also has guides 26, 28, 30 that protrude from surface 18 at the edges thereof to guide card 11 when it is placed against bottom surface 18 of reader 10.

FIG. 3 illustrates the placement of reader 10 against smart card 11 such that contacts 24 on reader 10 touch contacts 12 on smart card 11. Guides 26, 28 and 30 help to position card 11 such that a good contact is made between the respective electrical contacts 12, 24. Note that contacts 24, which are normally biased to protrude slightly away from surface 18 are pressed back forward surface 18 and into housing 14 when smart card 11 is pressed against reader 10.

The inside of housing 14 of reader 10 includes a circuit board 32 containing standard circuitry for reading information stored on smart card 11 via the electrical connection established by contacts 12, 24. The reader is activated by pressing down on switch 22 to bring a conductive pad 36 of switch 22 into contact with a conductive grid 38. Note that this type of switch is well known to those skilled in the art.

To use the reader, the user simply places the smart card against the reader and squeezes the card and reader together by, e.g., placing his thumb over switch 22 and his index finger on the bottom of smart card 11. As the user squeezes, switch 22 will be activated to deliver power to circuit board 32 from a suitable power source (not shown). Information stored on the smart card is read and displayed on display 20 (see FIG. 1).

Referring to FIG. 4, an alternative embodiment of the invention is shown in cross-section and features a reader 110 having a switch 122 that, when depressed, causes contacts 124 to be pressed more firmly against contacts 12 on smart card 11. Specifically, switch 122 includes an upper movable pad 140 that is connected to a membrane 142. A second membrane 144 is connected to the bottom of membrane 142, with a conductive grid 138 on the upper surface of membrane 144. A conductive pad 136 is on the bottom surface of pad 140.

When pad 140 is squeezed by a user to push it downward in FIG. 4, conductive pad 136 will contact conductive grid 138 to activate a circuit board 132 as in the embodiment of FIGS. 1-3. However, squeezing on pad 140 will also cause membranes 142, 144 to be deflected downward, which will cause contacts 124 to be more firmly pressed against the corresponding contacts 12 on smart card 11. When the reader is not in use, the contacts 124 need not protrude from the reader.

Figure 5:
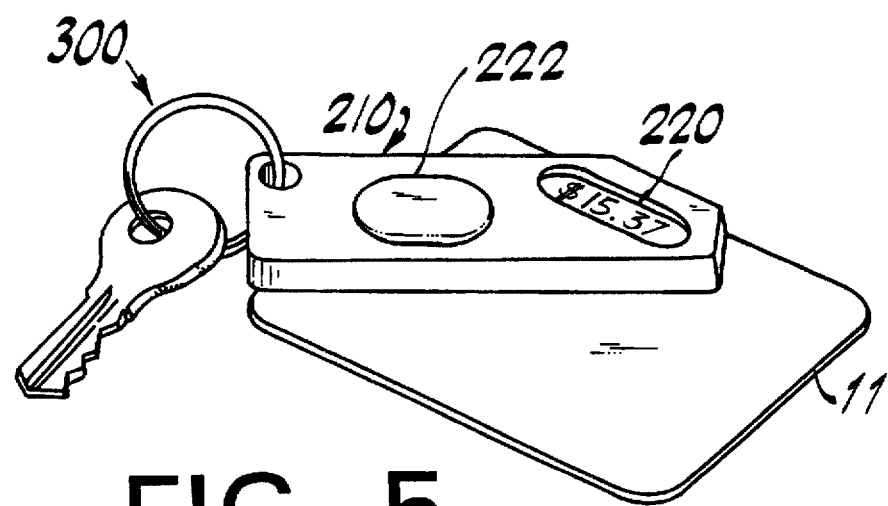
FIG. 5 is a perspective view of a third embodiment of the invention.

The invention can take many shapes, and is not limited to the rectangular embodiments described above. For example, FIG. 5 illustrates another embodiment of the invention, with a reader 210 placed over smart card 11 to display the information on smart card 11 on a display 220. A switch 222 activates the reader.

The FIG. 5 embodiment is even smaller than previous embodiments and is here shown attached to a key chain 300. (This is sometimes referred to as a key chain "FOB".)

The above description is illustrative of the invention only and other embodiments within the scope and spirit of the appended claims. For example, a number of different types of switches may be used with the invention, including a "snap action" membrane switch, which uses a stainless steel or spring metal disc that "snap" when pressed to give a tactile feel. In such a switch, the steel spring disc is pressed against a grid pattern on a circuit, shorting the pads, which then completes the circuit (similar to the simple membrane switch shown if FIGS. 3-4).

Other types of switches that could be used include a rubber tactile switch, where a rubber or similar material is molded into a key shape which is loosely attached to a thin rubber "skirt." When pressed, the key can move in relation to the skirt. A conductive pad is located on the underside of the key, and this pad shorts a rid pattern when the key is pressed, similar to the switches discussed above.

The switch can also be located on the bottom side of the reader, so that when the smart card and the reader are pressed together, the smart card itself activates the switch, instead of the thumb activating the switch. A switch can also be used that combines the contacts and switch function into the same device. In other words, the movement of the contacts into the housing of the reader when the smart card is pressed against the reader can activate the switch.

Figure 6:
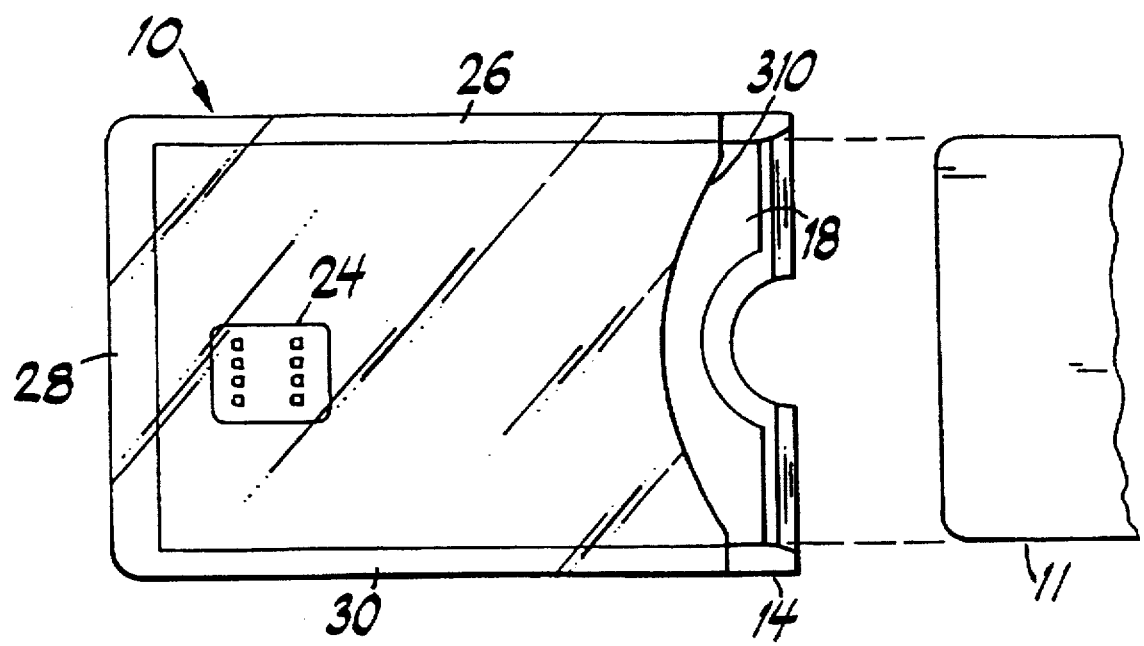
FIG. 6 is a bottom view of the reader and smart card.

Finally, as shown in FIG. 6, the reader of the invention may include some type of plastic cover, including a cover 310 that extends away from the bottom surface of the reader to, in effect create a soft slot for placement of the smart card. This type of slot, of course, is not a traditional slot in that it will not have a rigid bottom, and is not necessary for reader function. It will merely serve to provide an extra measure of protection for the reader contacts. When not in use such a plastic cover 310 would collapse toward the reader, thereby taking up little space. It could also be removed from the reader by the user for cleaning.

Other modifications to the present invention are within the spirit of the appended claims.

I claim:

1. A method for activating a smart card reader comprising:
   inserting a smart card into a gap in said reader, said gap being formed by a lower surface of said reader and a flexible cover affixed to and spaced from said lower surface; and
   applying pressure to said flexible cover thereby moving said smart card toward said lower surface of said reader.

2. The method of claim 1, wherein said step of applying pressure to said flexible cover causes a plurality of electrical contacts affixed to said lower surface of said reader to contact corresponding contacts on said smart card.

3. The method of claim 1, further comprising reading data from said smart card and displaying said data on a display device.

4. The method of claim 1 wherein said reader comprises an upper surface having a switch and wherein said method further comprises applying pressure to said switch during said step of applying pressure to said flexible cover.

5. The method of claim 4, wherein said step of applying pressure to said switch causes a plurality of electrical contacts affixed to said lower surface of said reader to protrude out from said lower surface of said reader.

6. The method of claim 1, wherein a plurality of electrical contacts affixed to said lower surface of said reader are movably recessed in said lower surface of said reader and wherein said method further comprises applying pressure to an upper surface of said reader during said step of applying pressure to said flexible cover thereby causing said plurality of electrical contacts of said reader to more firmly contact corresponding contacts on said smart card.

\* \* \* \* \*